United States Patent
Holz et al.

(10) Patent No.: US 8,316,810 B2
(45) Date of Patent: Nov. 27, 2012

(54) METHOD AND DEVICE FOR STOPPING AND STARTING THE ENGINE OF HYBRID VEHICLES

(75) Inventors: Matthias Holz, Lehre (DE); Michael Zillmer, Sickte (DE); Ekkehard Pott, Gifhorn (DE); David Prochazka, Libosovice (CZ)

(73) Assignees: Volkswagen AG, Wolfsburg (DE); Skoda Auto A.S., Mlada (CZ)

( * ) Notice: Subject to any disclaimer, the term of this patent is extended or adjusted under 35 U.S.C. 154(b) by 1293 days.

(21) Appl. No.: 11/596,553

(22) PCT Filed: May 4, 2005

(86) PCT No.: PCT/EP2005/004830
§ 371 (c)(1),
(2), (4) Date: Aug. 9, 2007

(87) PCT Pub. No.: WO2005/110793
PCT Pub. Date: Nov. 24, 2005

(65) Prior Publication Data
US 2007/0277773 A1    Dec. 6, 2007

(30) Foreign Application Priority Data
May 10, 2004    (DE) .......................... 10 2004 023 503

(51) Int. Cl.
*F02N 11/08* (2006.01)
(52) U.S. Cl. .................................... 123/179.4; 903/905
(58) Field of Classification Search .................. 903/902, 903/905, 906; 180/65.21, 65.26, 65.265, 180/65.28, 65.285, 65.31, 69.4, 69.5, 69.3; 123/179.1, 179.28, 179.12, 179.29, 179.3, 123/179.4, 198 F, 198 DB, 481; 701/101–104, 701/110, 112
See application file for complete search history.

(56) References Cited

U.S. PATENT DOCUMENTS

| 4,066,941 | A | * | 1/1978 | Foster ........................... 388/809 |
| 4,454,843 | A | * | 6/1984 | Uchida et al. .............. 123/179.4 |

(Continued)

FOREIGN PATENT DOCUMENTS

DE    199 36 885    2/2001

OTHER PUBLICATIONS

International Search Report, PCT International Patent Application No. PCT/EP2005/004830, Sep. 5, 2005.

(Continued)

*Primary Examiner* — Stephen K Cronin
*Assistant Examiner* — Raza Najmuddin
(74) *Attorney, Agent, or Firm* — Kenyon & Kenyon LLP

(57) ABSTRACT

In a method and a device for engine stop/engine start of hybrid vehicles, which includes an internal combustion engine and an electric machine which is coupled to the internal combustion engine and is selectively able to be operated regeneratively or motively, the engine speed can be detected and compared to a limit speed to initiate the stopping of the engine in a hybrid vehicle using an automatic start/stop mechanism, and if the engine speed drops to the threshold speed, the engine is stopped, the electric machine being switched over into the motive or the regenerative operation when the limit speed is reached; the electric machine assuming the limit speed, whereas the fuel supply of the internal combustion engine is shut down or remains shut down and the electric machine initiates the stopping of the internal combustion engine.

15 Claims, 1 Drawing Sheet

U.S. PATENT DOCUMENTS

| | | | | |
|---|---|---|---|---|
| 4,494,497 | A * | 1/1985 | Uchida et al. | 123/179.4 |
| 4,510,396 | A * | 4/1985 | Uchida et al. | 290/30 R |
| 4,555,006 | A * | 11/1985 | Uchida et al. | 477/167 |
| 5,325,827 | A * | 7/1994 | Fasola | 123/179.3 |
| 5,337,713 | A * | 8/1994 | Mills | 123/179.3 |
| 5,495,127 | A * | 2/1996 | Aota et al. | 290/31 |
| 5,632,238 | A * | 5/1997 | Furukawa et al. | 123/179.3 |
| 6,011,373 | A * | 1/2000 | McConnell et al. | 318/560 |
| RE36,678 | E * | 5/2000 | Moroto et al. | 180/65.23 |
| 6,190,284 | B1 * | 2/2001 | Kuroda et al. | 477/107 |
| 6,192,847 | B1 * | 2/2001 | Davis | 123/179.4 |
| 6,283,086 | B1 * | 9/2001 | Yamamoto et al. | 123/198 D |
| 6,453,865 | B2 * | 9/2002 | Hirose et al. | 123/179.4 |
| 6,602,164 | B2 * | 8/2003 | Yoshiaki et al. | 477/107 |
| 6,629,515 | B1 * | 10/2003 | Yamamoto et al. | 123/179.4 |
| 6,692,404 | B2 * | 2/2004 | Matsubara et al. | 477/4 |
| 6,714,852 | B1 * | 3/2004 | Lorenz et al. | 701/102 |
| 6,807,476 | B2 * | 10/2004 | Ando et al. | 701/110 |
| 7,204,222 | B2 * | 4/2007 | Yamauchi et al. | 123/179.4 |
| 7,228,209 | B2 * | 6/2007 | Izawa et al. | 701/22 |
| 7,261,076 | B2 * | 8/2007 | Hoevermann | 123/179.4 |
| 7,653,478 | B2 * | 1/2010 | Park | 701/112 |
| 7,669,569 | B2 * | 3/2010 | Tamai et al. | 123/179.4 |
| 2004/0153236 | A1 * | 8/2004 | Itoh et al. | 701/113 |
| 2007/0245997 | A1 * | 10/2007 | Levasseur et al. | 123/179.4 |
| 2010/0222951 | A1 * | 9/2010 | Tanaka et al. | 701/22 |
| 2010/0273604 | A1 * | 10/2010 | Imaseki | 477/5 |

OTHER PUBLICATIONS

Written Opinion of the International Searching Authority, PCT International Patent Application No. PCT/EP2005/004830, Sep. 5, 2005 (translation provided).

* cited by examiner

METHOD AND DEVICE FOR STOPPING AND STARTING THE ENGINE OF HYBRID VEHICLES

FIELD OF THE INVENTION

The present invention relates to a method and a device for stopping and starting the engine of hybrid vehicles.

BACKGROUND INFORMATION

In vehicles having hybrid drive, the internal combustion engine is shut down, as a rule, during standstill phases via an appropriate start-stop function for a broadened savings in fuel consumption. Since hybrid vehicles have electric motors of clearly greater performance power instead of conventional starters, it is possible to have great comfort during an automatic engine start after a start-stop phase.

The automatic stop operation in hybrid vehicles is generally initiated only when the engine is within the range of idling speed or has reached it. However, because of this, the internal combustion engine is intercepted from a deceleration fuel cutoff, that was possibly initiated previously, by the idle-speed controller above the idling speed (restart speed), and is brought down to the required idling speed. This is required, since after falling below the restart speed, the engine speed would drop off in an uncontrolled manner, and stalling would occur in the worst case. Besides stressing the bearings, such a jolting shutdown is not desirable from a comfort point of view. this procedure reduces the maximum consumption advantage that can be achieved by the stop operation of the internal combustion engine by the duration of the active idle-speed controller.

SUMMARY

Example embodiments of the present invention may provide a method and a device for engine stop/engine start of hybrid vehicles by which, at uniform or increased comfort, the use of fuel may be reduced.

For this design approach, when it reaches a limit speed, the electric machine is switched over into motive or regenerative operation, the electric machine taking up the limit speed, whereas the fuel supply of the internal combustion engine is cut off or remains cut off, and the electric machine carries the internal combustion engine over into the engine stop. Because of the taking up of the engine speed by the electric machine, the engine speed may be regulated specifically to zero, because of which the internal combustion engine does not have to be fired. It should be noted in this context that the limit speed, at which the electric machine takes up the engine speed, may also lie above or below the restart speed. The electric machine may take up the engine speed in regenerative operation, since recuperation energy may still be gained thereby.

The engine stop of the internal combustion engine may be performed via the electric machine in a torque controlled or speed controlled manner.

The shut down position of the internal combustion engine may be specifiably adjustable by the regulation of the angle of revolution of the electric machine. From this, the position of the cylinder of the internal combustion engine is known, so that a restart of the internal combustion engine may be simplified.

The restart of the internal combustion engine after the initiation of an automatic stop operation may be accomplished by various methods. Thus, in vehicles having automatic transmissions, the release of the brake pedal or the operation of the accelerator may be used as a signal for the restart. However, it should be ensured by the transmission control that no gear has been engaged or that there is no force locking in an automatic clutch unit. In a vehicle having a manual shift transmission, the starting procedure may be initiated by stepping on the clutch pedal. In this instance, before the beginning of the starting procedure, it should be ensured that the clutch is fully separated and/or that no gear is engaged, which may be recorded, for instance, using a gear sensor.

In order to make use of as great as possible a fuel consumption saving even in stop operation, it is further provided not to execute the restart of the internal combustion engine already at the beginning of the clutch operation "clutch is opening" but rather only upon the detection of "clutch is closing". This distinction may be ensured, for example, by a so-called interlock switch, both the clutch position "clutch fully open" and "clutch fully closed" being detected. Because of this, even in a vehicle at standstill and completely floored clutch (e.g., at a traffic light stop) the maximum usage advantage may be implemented, in which the internal combustion engine is started only when the driver releases the clutch pedal.

The inverter of the electric machine may be already activated when the clutch is opened, and the magnetization current of the electric machine may be built up to a freely applicable value or to a maximum required value for the start. The engine starting procedure is able to take place relatively simultaneously with the closing of the clutch.

The electric machine may be arranged as a crankshaft starter-generator, in order better to be able to intercept the torques occurring in response to the taking up of the engine speed.

The control of the internal combustion engine and the electric machine may be accomplished via a control unit. In this context, the function is able to be integrated into the control unit of the internal combustion engine or the electric machine. However, it is also possible to provide a separate control unit.

Example embodiments of the present invention are described below with reference to the appended Figures.

DETAILED DESCRIPTION

Figure 1:
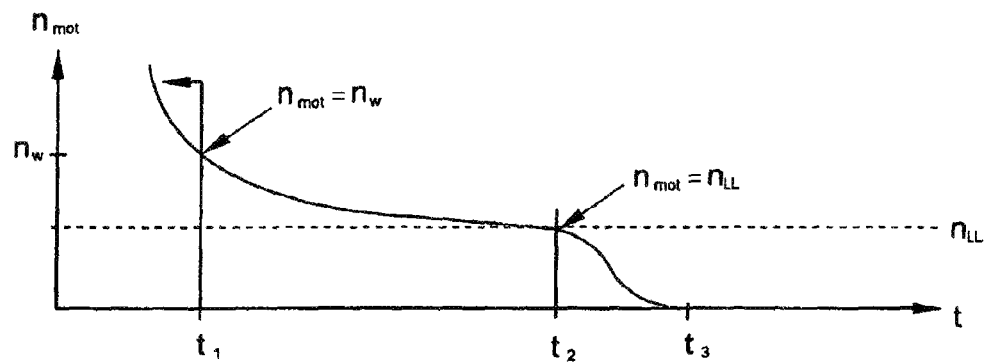
FIG. 1 illustrates a curve of the speed $n_{mot}$ plotted against time t in the case of an engine stop having an automatic start-stop system (e.g., a conventional system).

A conventional system is described with reference to FIG. 1. Before time $t_1$, a deceleration fuel cutoff is present, that is, the internal combustion engine is no longer fired. Along with that, engine speed $n_{mot}$ falls off up to time $t_1$ to a restart speed $n_W$. When restart speed $n_W$ is reached, the internal combustion engine is switched on again, and the engine speed is brought back to idling speed $n_{LL}$ via the idle-speed controller, which is achieved at time $t_2$. Only after idle speed $n_{LL}$ has been reached, at time $t_2$ the internal combustion engine is shut down, and engine speed $n_{mot}$ falls off to zero in an unregulated manner up to time $t_3$.

Figure 2:
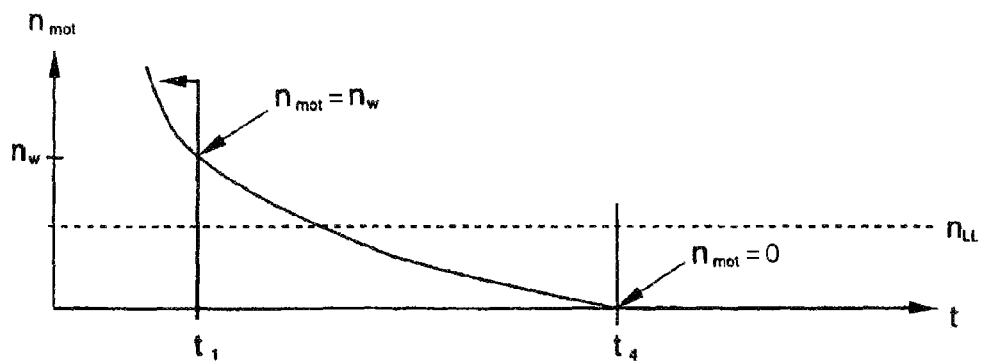
FIG. 2 illustrates a curve of the speed $n_{mot}$ in the engine stop according to an example embodiment of the present invention.

FIG. 2 illustrates a method according to an example embodiment of the present invention. The internal combustion engine is again in deceleration fuel cutoff, in this context, speed $n_{mot}$ falling off up to time $t_1$ to restart speed $n_W$ or to a freely selectable value for the limit speed. At time $t_1$ the electric machine is then switched to the motive or regenerative operation, and assumes speed $n_W$ or the freely selected limit speed. Thereafter, the electric machine regulates engine speed $n_{mot}$ in a speed regulated or torque regulated manner up to time $t_4$, $t_4$ being, e.g., less than $t_3$. In this context, the speed regulation takes place specified by the rotation angle regulation of the electric machine, so that the exact shutoff position of the internal combustion engine is known at time $t_4$.

What is claimed is:

1. A device for an engine stop/engine start of a hybrid vehicles, comprising
    an internal combustion engine; an electric machine coupled to the internal combustion engine, the electric machine selectively operable regeneratively or motively, an engine speed recordable and comparable to a limit speed to initiate an engine stop in a start/stop automatic system;
    wherein the device is adapted to initiate the engine stop in response to a decrease of the engine speed to the limit speed, the device configured to switch over the electric machine into one of (a) a motive operation and (b) a regenerative operation when the limit speed is reached; the electric machine adapted to assume the limit speed, the device configured to at least one of (a) shut down and (b) remain shut down a fuel supply of the internal combustion engine, the electric machine adapted to rotate the internal combustion engine over into the engine stop.

2. The device according to claim 1, wherein the motor stop of the electric machine is adapted to take place in at least one of (a) a torque-regulated and (b) a speed-regulated manner.

3. The device according to claim 1, wherein a shutdown position of the internal combustion engine is specifiably adjustable by regulation of an angle of rotation.

4. The device according to claim 1, wherein a pedal activity is recordable to restart the internal combustion engine, the electric machine adapted to restart the internal combustion engine as a function of the pedal activity.

5. The device according to claim 4, wherein, in a vehicle having a manually operated transmission, the operation of the clutch is recordable.

6. The device according to claim 5, wherein a starting procedure is adapted to take place in response to a closing of a clutch.

7. The device according to claim 6, A device for an engine stop/engine start of a hybrid vehicle, comprising:
    an internal combustion engine;
    an electric machine coupled to the internal combustion engine, the electric machine selectively operable regeneratively or motively, an engine speed recordable and comparable to a limit speed to initiate an engine stop in a start/stop automatic system;
    wherein the device is adapted to initiate the engine stop in response to a decrease of the engine speed to the limit speed, the device configured to switch over the electric machine into one of (a) a motive operation and (b) a regenerative operation when the limit speed is reached; the electric machine adapted to assume the limit speed, the device configured to at least one of (a) shut down and (b) remain shut down a fuel supply of the internal combustion engine, the electric machine adapted to rotate the internal combustion engine over into the engine stop;
    wherein a pedal activity is recordable to restart the internal combustion engine, the electric machine adapted to restart the internal combustion engine as a function of the pedal activity;
    wherein, in a vehicle having a manually operated transmission, the operation of the clutch is recordable;
    wherein a starting procedure is adapted to take place in response to a closing of a clutch;
    wherein an inverter of the electric machine is activatable in response to an opening of the clutch, and the magnetization current of the electric machine is built up.

8. The device according to claim 1, wherein the electric machine includes a crankshaft starter/generator.

9. A method for an engine stop/engine start of a hybrid vehicle including an internal combustion engine and an electric machine coupled to the internal combustion engine, the electric machine selectively operable regeneratively or motively, an engine speed recordable and comparable to a limit speed to initiate an engine stop in a start/stop automatic system, comprising:
    initiating the engine stop in response to a decrease of the engine speed to the limit speed;
    switching over the electric machine into one of (a) a motive operation and (b) a regenerative operation when the limit speed is reached, the electric machine assuming the limit speed;
    at least one of (a) shutting down and (b) remaining shut down a fuel supply of the internal combustion engine; and
    rotating the internal combustion engine into the engine stop by the electric machine.

10. The method according to claim 9, wherein the motor stop of the electric machine takes place in at least one of (a) a torque regulated and (b) a speed regulated manner.

11. The method according to claim 9, further comprising specifiably adjusting a shutdown position of the internal combustion engine by regulation of an angle of rotation.

12. The method according to claim 9, further comprising:
    recording a pedal activity for restarting the internal combustion engine; and
    restarting the internal combustion engine by the electric machine as a function of the pedal activity.

13. The method according to claim 12, further comprising recording operation of a clutch in a vehicle having a manually operated transmission.

14. The method according to claim 13, further comprising performing the restarting procedure in response to a closing of the clutch.

15. The method according to claim 14, further comprising: A method for an engine stop/engine start of a hybrid vehicle including an internal combustion engine and an electric machine coupled to the internal combustion engine, the electric machine selectively operable regeneratively or motively, an engine speed recordable and comparable to a limit speed to initiate an engine stop in a start/stop automatic system, comprising:
    initiating the engine stop in response to a decrease of the engine speed to the limit speed;
    switching over the electric machine into one of (a) a motive operation and (b) a regenerative operation when the limit speed is reached, the electric machine assuming the limit speed;

at least one of (a) shutting down and (b) remaining shut down a fuel supply of the internal combustion engine;

rotating the internal combustion engine into the engine stop by the electric machine;

recording a pedal activity for restarting the internal combustion engine;

restarting the internal combustion engine by the electric machine as a function of the pedal activity;

recording operation of a clutch in a vehicle having a manually operated transmission;

performing the restarting procedure in response to a closing of the clutch;

activating an inverter of the electric machine in response to an opening of the clutch; and building up a magnetization current of the electric machine.

* * * * *